United States Patent [19]

Ogawa

[11] Patent Number: 5,221,235

[45] Date of Patent: Jun. 22, 1993

[54] PULLEY ASSEMBLY FOR A CONTINUOUSLY VARIABLE TRANSMISSION

[75] Inventor: Hiroshi Ogawa, Tokyo, Japan

[73] Assignee: Fuji Jukogyo Kabushiki Kaisha, Tokyo, Japan

[21] Appl. No.: 724,855

[22] Filed: Jul. 2, 1991

[30] Foreign Application Priority Data

Jul. 19, 1990 [JP] Japan ............... 2-777098[U]

[51] Int. Cl.$^5$ .............................. F16H 61/00
[52] U.S. Cl. .......................... 474/25; 474/28; 74/868
[58] Field of Search ............ 474/25, 28; 74/867, 74/868

[56] References Cited

U.S. PATENT DOCUMENTS

| 4,391,162 | 7/1983 | Burke | 74/579 R |
| 4,439,170 | 3/1984 | Steuer | 474/28 |
| 4,575,364 | 3/1986 | Lamers | 474/28 X |
| 4,612,003 | 9/1986 | Ohzono et al. | 474/28 |

Primary Examiner—Ramon S. Britts
Assistant Examiner—Roger J. Schoeppel
Attorney, Agent, or Firm—Beveridge, DeGrandi, Weilacher & Young

[57] ABSTRACT

In a continuously variable belt transmission wherein each of primary and secondary pulley devices consists of a stationary pulley and a movable pulley, and wherein the movable pulley is furnished with a hydraulic servo system having a cylinder which is connected at one end with the movable pulley, and a plunger which slides liquid-tightly within the cylinder; a pulley assembly for a continuously variable belt transmission (1) comprising the fact that the end (19b) of the cylinder (19) to be connected with the movable pulley (10b) of the secondary pulley device is formed with a clinch portion (19f) whose inside diameter is made larger than the outside diameter of the sliding part (16b, 18) of the plunger (16). In connecting the cylinder (19) to the movable pulley (10b) while covering the plunger (16) which is attached to the secondary shaft (5) of the transmission (1), the oil seal ring (18) of the plunger (16) is not nibbled.

8 Claims, 3 Drawing Sheets

PULLEY ASSEMBLY FOR A CONTINUOUSLY VARIABLE TRANSMISSION

BACKGROUND OF THE INVENTION

The present invention relates to a pulley assembly for a continuously variable transmission. Concretely, it relates to the secondary-side pulley device of a belt type continuously variable transmission for a motor vehicle, and more particularly to the clinch connection between the sideward flange portion of a movable pulley and the open end portion of a hydraulic cylinder.

As a continuously variable transmission of this type, there has been proposed one of a construction which has a primary pulley on an engine side and a secondary pulley on a wheel side, and in which a belt is wound over both the pulleys. A primary pressure for a speed change is supplied into and drained from the cylinder of the primary pulley, while a secondary pressure corresponding to a transmission torque is normally supplied into the cylinder of the secondary pulley. Herein, when an revolution speed of the secondary pulley is sharply raised by the variable speed, a centrifugal oil pressure takes place in an oil chamber of secondary pulley and the primary pressure balancing the secondary pressure fluctuates.

In the secondary pulley on the output side, therefore, a balance chamber is provided in adjacency to a secondary chamber so as to cancel the centrifugal oil pressure of the secondary pressure with the centrifugal oil pressure of the balance chamber. In this case, the secondary pulley side includes a partitioning plunger which is fixed integrally with a secondary shaft. The cylinder which is common to the secondary chamber and the balance chamber is snugly fitted on the plunger through an oil seal. Besides, the open end part of the cylinder on one side thereof is integrally connected to the movably pulley side of the secondary pulley.

Regarding the construction of the secondary pulley, there has heretofore been, for example, a prior art technique disclosed in the official gazette of Japanese Utility Model Registration Application Laid-open No. 52359/1987. Here, it is indicated that a hydraulic servo cylinder and a cover for canceling a centrifugal oil pressure are dividedly formed, that one end of the cylinder is fastened to a movable pulley side, that the oil seal is snugly fitted in a plunger of the cylinder, and that the cover is connected integrally with the outer end of the cylinder by the engaging a protrusion in a groove and the baking of a sealing rubber ring.

In the prior-art technique mentioned above, problems such as the complication of mounting and the increased number of man-hour are involved because the cover for canceling the centrifugal oil pressure is formed separately from the hydraulic servo cylinder.

In this regard, it is considered that the cylinder is integrally formed so as to serve also as the cover of the balance chamber and is snugly fitted on the oil seal of the plunger, whereupon the open end part of the cylinder is clinched and connected to the movable pulley side. With this construction, the connection is facilitated. Since, however, the chamfering of the open end part of the cylinder is limited in point of ensuring the clinch, the oil seal of the plunger is liable to undergo nibbles or defects in fitting the cylinder on this oil seal. Accordingly, the clinch connection of the cylinder needs to be contrived so as to prevent the nibbles of the oil seal of the plunger attributed to the cylinder.

SUMMARY OF THE INVENTION

The present invention has been made in view of such drawbacks, and its object has been made to provide a pulley assembly for a continuously variable transmission in which a cylinder included on the side of a secondary pulley and serving also as a balance chamber can be securely clinched and connected to a movable pulley side while being prevented from nibbling the oil seal of a plunger.

In order to accomplish the object, a pulley assembly according to the present invention consists in a continuously variable transmission wherein an endless belt is wound over a pair of pulley devices each having a stationary side pulley which is integral with a corresponding one of an input shaft and an output shaft, a movable side pulley which slides on the corresponding shaft so as to vary a pulley interval, and a hydraulic servo system in which a cylinder mounted on the movable side pulley has its one end connected to the movable side pulley and in which a plunger connected integrally with the corresponding shaft is mounted so as to slide liquid-tightly within the cylinder; comprising the fact that said one end of said cylinder to be connected with said movable side pulley of said output shaft includes a clinch portion whose inside diameter is larger than an outside diameter of a sliding part of said plunger.

On the basis of the above construction, when the cylinder is to be fitted and mounted on the plunger of the hydraulic servo system of the pulley, an oil seal at the outer peripheral part of the plunger is compressed wholly and gradually by a tapered portion of large area formed at the open end part of the cylinder and is brought into slidable contact with the cylinder without undergoing a nibble or the like, and the cylinder is securely clinched and connected to the movable pulley side by its clinch portion chamfered little.

DETAILED DESCRIPTION OF THE PREFERRED EMBODIMENTS

Now, embodiments of the present invention will be described with reference to the drawings.

Figure 1:
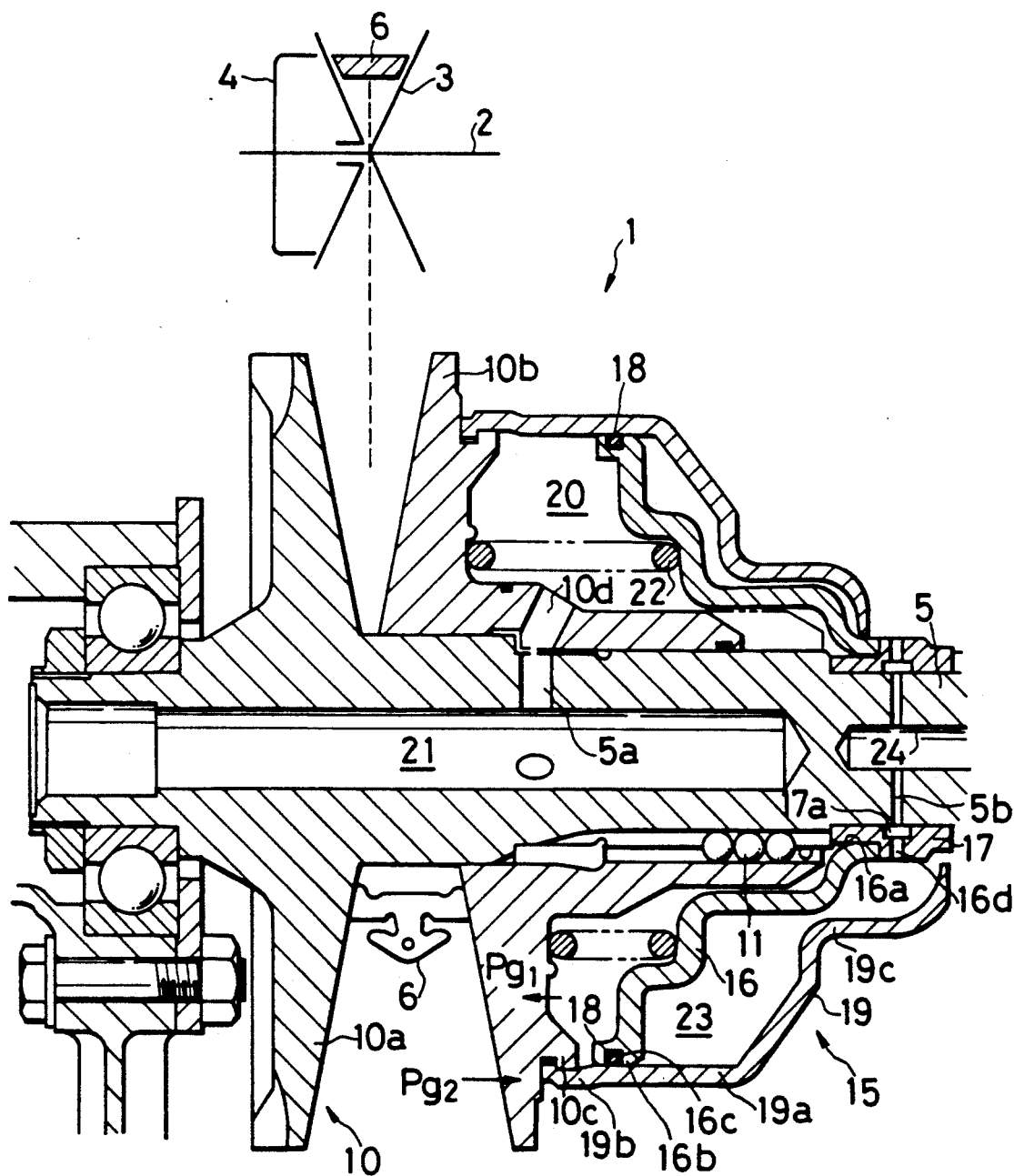
FIG. 1 is a sectional view showing the first embodiment of a pulley assembly for a continuously variable transmission according to the present invention.

Referring to FIG. 1, numeral 1 designates a continuously variable transmission, in which a primary pulley 3 is provided on a primary shaft 2 on an engine side so as to be capable of varying a pulley interval, and a hydraulic servo system 4 is mounted on the primary pulley 3. A secondary pulley 10 is provided on a secondary shaft 5 on an output side, and a hydraulic servo system 15 is mounted also on the secondary pulley 10. A belt 6 is wound between the primary pulley 3 and the secondary pulley 10.

The secondary pulley 10 is so constructed that a stationary pulley 10a is formed integral with the secondary shaft 5, and that a movable pulley 10b forming a pair with the stationary pulley 10a is movably fitted on this stationary pulley in order to vary a pulley interval through ball means 11. The hydraulic servo system 15 is so constructed that a plunger 16 formed in the shape of a stepped cylinder is integrally fixed on the side of the movable pulley 10b with its inner peripheral portion 16a connected to the spacer 17 of the secondary shaft 5, and that an oil seal 18 is fitted in a groove 16c provided in the outer peripheral portion 16b of the plunger 16.

In addition, a cylinder 19 is formed in the shape of a stepped cylinder so as to serve also as a balance chamber. The cylindrical portion 19a of the cylinder 19 is held in slidable contact with the oil seal 18 of the plunger 16, and the open end portion 19b thereof is integrally clinched and connected to a flange portion 10c formed at the side part of the movable pulley 10b. Thus, a secondary chamber 20 is defined on one side of the plunger 16, and the secondary pressure passage 21 of the secondary shaft 5 is held in communication with this secondary chamber 20 through radial bores 5a, 10d etc. A return spring 22 is urgingly retained between the movable pulley 10b and the plunger 16.

Besides, on the side of the plunger 16 remote from the movable pulley 10b, a balance chamber 23 is defined by the reduced diameter portion 19c of the cylinder 19 so as to change and increase its volume in the operation of a speed change to a higher speed. The lubricating pressure passage 24 of the secondary shaft 5 supplies oil into the balance chamber 23 through radial bores 5b, 17a and 16d in only the operation of the speed change to, at least, a top speed stage. Thus, the movable pulley 10b of the secondary pulley 10 is moved rightwards as viewed in FIG. 1, to reduce the winding diameter of the belt 6, whereby the transmission is shifted to the top speed stage. At this time, the centrifugal oil pressure Pg1 of oil in the secondary chamber 20 acts on the movable pulley 10b leftwards as viewed in the figure. On the other hand, the centrifugal oil pressure Pg2 of the lubricating oil supplied into the balance chamber 23 acts on the movable pulley 10b through the cylinder 19 rightwards as viewed in the figure, to cancel the centrifugal oil pressure Pg1.

Figure 2:
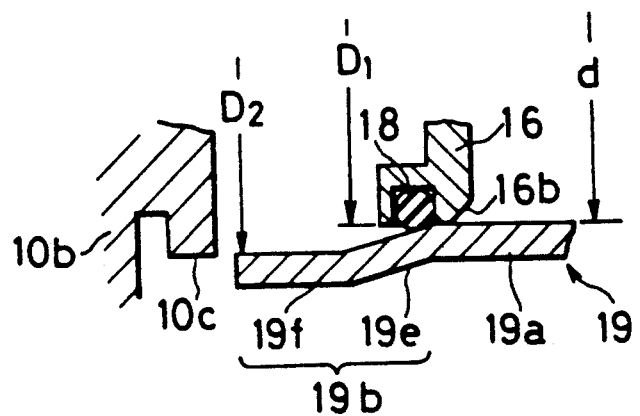
FIGS. 2(a) and 2(b) are enlarged sectional views showing the states of a cylinder before and after clinch connection, respectively.
Figure 2B:
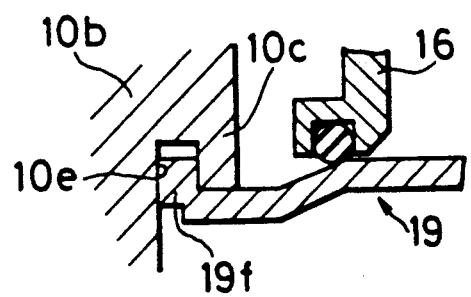

Regarding the above construction, the clinch connection side of the cylinder 19 will be described in detail with reference to FIGS. 2(a) and 2(b). First, as shown in FIG. 2(a), the outside diameter D2 of the flange portion 10c of the movable pulley 10b is made somewhat larger than the outside diameter D1 of the outer peripheral portion 16b of the plunger 16 as well as the inside diameter d of the cylindrical portion 19a of the cylinder 19. In addition, the open end portion 19b of the cylinder 19 is formed in such a manner that a clinch portion 19f has its diameter enlarged through a tapered portion 19e relative to the inside diameter d of the cylindrical portion 19a so as to be equal to the outside diameter D2 of the flange portion 10c of the movable pulley 10b. Herein, the clinch portion 19f is hardly chamfered so as to permit secure clinch, and the tapered portion 19e of large area is provided outside the position of the oil seal 18 corresponding to the smallest speed change ratio of the transmission.

Owing to such a construction, when the cylinder 19 is to be mounted, it is fitted on the outer side of the plunger 16 with the open end portion 19b as an advancing front end. On this occasion, at the initial stage, the large-diameter clinch portion 19f of the cylinder 19 is loosely fitted on the oil seal 18 of the plunger 16 and is advanced without any deformation. Subsequently, the entire area of the protruding part of the oil seal 18 comes into contact with the large-area tapered portion 19e, and the whole oil seal 18 is compressively deformed gradually. In this way, the oil seal 18 is compressed to reduce its diameter by the tapered portion 19e without undergoing a nibble or the like, and it is brought into slidable contact with the inner surface of the cylindrical portion 19a of the cylinder 19. Thereafter, as shown in FIG. 2(b), the clinch portion 19f of the cylinder 19 has its front end located in agreement with the flange portion 10c and indent 10e of the movable pulley 10b, and it is pressed into the indent 10e by a tool, thereby to integrally clinch and connect the cylinder 19.

Figure 3:
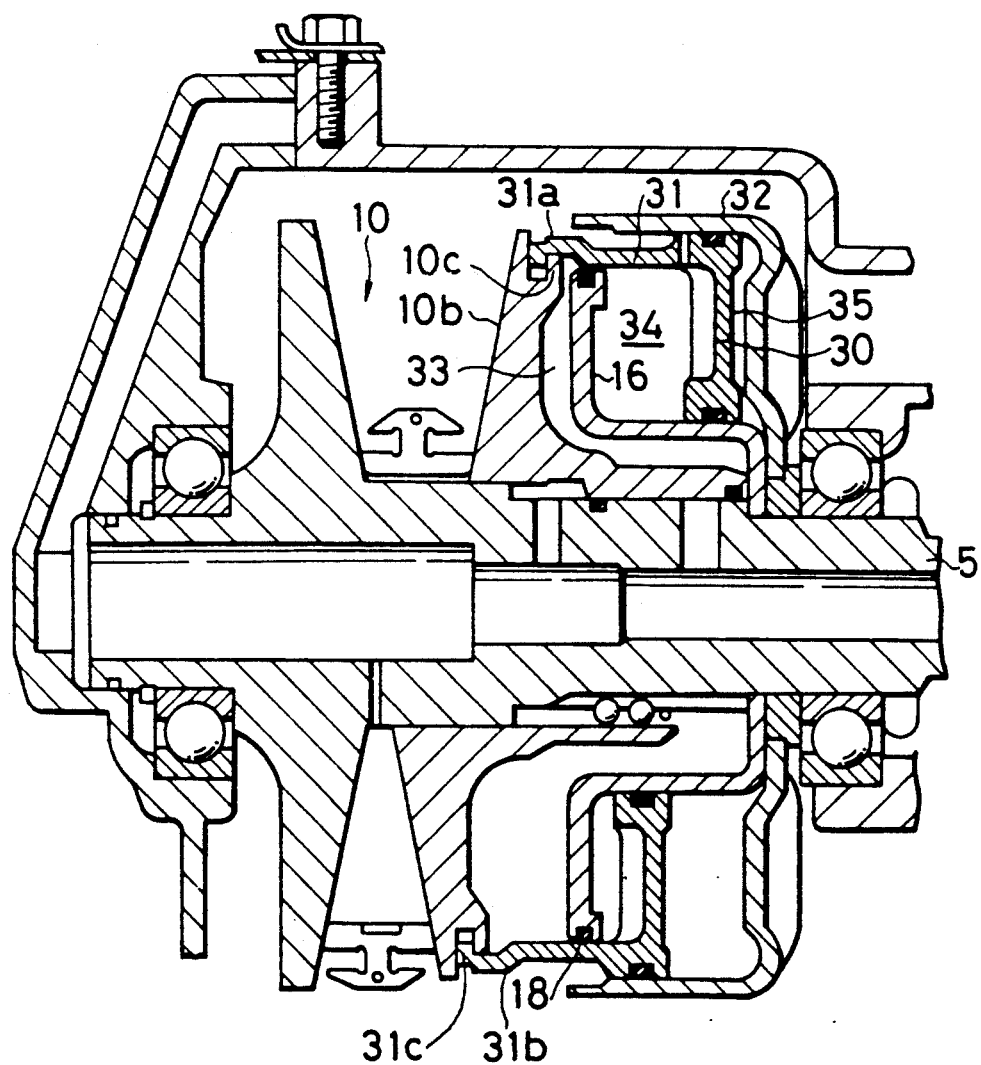
FIG. 3 is a sectional view showing the second embodiment of the present invention applied to a double cylinder type pulley device.

Referring to FIG. 3, the second embodiment of the present invention will be described as to the case of application to a double cylinder type pulley device.

In this embodiment, a first cylinder 31 furnished with a piston 30 is snugly fitted on a plunger 16 provided on the side of the movable pulley 10b of the secondary pulley 10, a second cylinder 32 is snugly fitted on the piston 30, and the open end portion 31a of the first cylinder 31 is clinched and connected to the flange portion 10c of the movable pulley 10b. Here, a first cylinder chamber 33 is defined between the plunger 16 and the movable pulley 10b on one side thereof, a balance chamber 34 is defined between the plunger 16 and the piston 30 on the other side thereof, and a second secondary chamber 35 is defined between the piston 30 and the second cylinder 32. Thus, pressing pulley forces are exerted double by the secondary pressures of the first and second secondary chambers 33, 35.

Even in such an embodiment, the open end portion 31a of the first cylinder 31 furnished with the piston 30 is formed with a clinch portion 31c of larger diameter through a tapered portion 31b, so that an oil seal 18 inserted in the outer periphery of the plunger 16 is prevented from being nibbled.

As thus far described, according to the present invention, in that construction of the hydraulic servo system of the secondary pulley of a continuously variable transmission in which a cylinder is snugly fitted through an oil seal on a plunger for partitioning a secondary chamber and a balance chamber, the open end portion of the cylinder is formed with a clinch portion having an inside diameter larger than that of the cylindrical portion of the cylinder, with a tapered portion of large area intervening between the clinch portion and the cylindrical portion, and the oil seal is wholly compressed by the tapered portion in the operation of fitting and mounting the cylinder.

Therefore, the appearance of the nibbles of the oil seal is sharply reduced, and the job efficiency and sealing property of the secondary pulley are enhanced.

Further, since the clinch portion of the cylinder may be chamfered little, the strength of the clinch connection of the cylinder is enhanced.

Moreover, since the invention is similarly applicable to the double cylinder type pulley, it is extensively used.

While the presently preferred embodiment of the present invention has been shown and described, it is to be understood this disclosure is for the purpose of illustration and that various changes and modifications may be made without departing from the scope of the invention as set forth in the appended claims.

What is claimed is:

1. A continuously variable transmission having an endless belt being wound over a pair of pulley devices each having a stationary side pulley which is integral with a corresponding one of an input shaft and an output shaft of said transmission, a movable side pulley which slides on the corresponding shaft so as to vary a pulley interval, and a hydraulic servo system including a cylinder having an end portion connected to the movable side pulley and a cylindrical portion adjoining said end portion, and a plunger with a sliding part on the periphery thereof, connected with the corresponding shaft and mounted so as to slide liquid-tightly within the cylinder, comprising:

said end portion of said cylinder having an inside diameter larger than an inside diameter of said cylindrical portion of said cylinder.

2. The continuously variable transmission as defined in claim 1, wherein:

said sliding part of said plunger includes an oil seal ring which is compressible.

3. A pulley assembly comprising a stationary disk with a shaft, a movable disk slidably and rotatably supported on said shaft coaxially with said stationary disk, a hydraulic servo unit provided behind said movable disk for changing a gap between said disks, said hydraulic servo unit comprising:

a plunger fixed on said shaft, a cylinder having an end portion defining an opening and being fixed on said movable disk and a cylindrical portion adjoining said end portion;

said cylinder being located over and surrounding said plunger, said cylinder being positioned in place by moving said cylinder onto and over said plunger so as to define pressure chambers in said cylinder; and a seal member mounted on the periphery of said plunger and held in slidable contact with said cylindrical portion after the assembling;

said end portion having an inside diameter larger than an inside diameter of said cylindrical portion, thereby preventing said seal member from nibbling during the assembling.

4. The pulley assembly according to claim 3, wherein said end portion comprises a clinch portion at the edge of said cylinder to be clinched with a flange portion of said movable disk and a tapered portion intervening between said clinch portion and said cylindrical portion for guiding said seal member from said clinch portion to said cylindrical portion while gradually compressing said seal member.

5. The pulley assembly according to claim 3 further comprising:

a member mounted on an outside of said cylinder so as to define an additional chamber therebetween.

6. The pulley assembly according to claim 3, wherein said seal member is an oil seal.

7. The pulley assembly according to claim 3 being mounted on a continuously variable transmission.

8. A method for assembling a pulley assembly comprising a stationary disk with a shaft, a movable disk slidably and rotatably supported on said shaft coaxially with said stationary disk, and a hydraulic servo unit provided behind said movable disk for changing a gap between said disks, said hydraulic servo unit having a cylinder fixed on an outer side of said movable disk, a plunger fixed on said shaft and assembled in said cylinder to define pressure chambers therein, and a seal member mounted on the periphery of said plunger, comprising the steps of:

providing a clinch portion on an edge of said cylinder, to be engaged with said movable disk, a cylindrical portion adjoining said clinch portion and a tapered portion between said clinch portion and said cylindrical portion, said clinch portion having an inside diameter larger than the inside diameter of said cylindrical portion, whereby said tapered portion is tapered so as to enlarge said diameter from said cylindrical portion to said clinch portion;

inserting said plunger loosely into said clinch portion;

gradually compressing said seal member by continuing to insert said plunger along said tapered portion of said cylinder until said seal member forms a tight seal with said cylindrical portion; and clinching said clinch portion to fix said cylinder to said movable disk so as to easily assemble said pulley assembly without nibbling said sealing member.

* * * * *